US012670458B2

(12) United States Patent
Singh et al.

(10) Patent No.: US 12,670,458 B2
(45) Date of Patent: Jun. 30, 2026

(54) SYSTEM AND METHOD FOR CONTINUOUS IMPROVEMENT OF A CYBER SECURITY RATING OF A FIRM

(71) Applicant: Guardian Life Insurance Company of America, New York, NY (US)

(72) Inventors: Manas Singh, Chappaqua, NY (US); Naveen Kumar S, Attur (IN); Balaji Mukundan, Mylapore (IN); Daniel Johnson, Slingerlands, NY (US)

(73) Assignee: Guardian Life Insurance Company of America, New York, NY (US)

( * ) Notice: Subject to any disclaimer, the term of this patent is extended or adjusted under 35 U.S.C. 154(b) by 196 days.

(21) Appl. No.: 17/974,847

(22) Filed: Oct. 27, 2022

(65) Prior Publication Data

US 2024/0144136 A1     May 2, 2024

(51) Int. Cl.
*G06Q 10/0637* (2023.01)
*G06F 40/205* (2020.01)
*G06N 5/02* (2023.01)
*G06N 5/04* (2023.01)

(52) U.S. Cl.
CPC ..... *G06Q 10/06375* (2013.01); *G06F 40/205* (2020.01); *G06N 5/02* (2013.01); *G06N 5/04* (2013.01)

(58) Field of Classification Search
CPC .......... G06F 40/205; G06N 5/02; G06N 5/04; G06Q 10/06375; G06Q 10/0637
See application file for complete search history.

(56) References Cited

U.S. PATENT DOCUMENTS

| | | | |
|---|---|---|---|
| 8,595,831 | B2 | 11/2013 | Skare |
| 10,708,291 | B2 | 7/2020 | Findlay |
| 10,749,890 | B1 * | 8/2020 | Aloisio ................. H04L 63/302 |
| 10,986,106 | B2 | 4/2021 | Muddu et al. |
| 11,128,654 | B1 * | 9/2021 | Joyce ................... G06F 16/955 |
| 11,265,330 | B2 * | 3/2022 | Light ................. H04L 63/1408 |
| 11,336,677 | B2 | 5/2022 | Yampolskiy et al. |

(Continued)

FOREIGN PATENT DOCUMENTS

EP         0999489 A2     5/2000

OTHER PUBLICATIONS

Lee et al., "Learning Knowledge Using Frequent Subgraph Mining from Ontology Graph Data", Department of Industrial Engineering, Yonsei University, Seoul 03722, Korea. Applied Sciences, Jan. 20, 2021. (Year: 2021).*

(Continued)

*Primary Examiner* — Mehmet Yesildag
(74) *Attorney, Agent, or Firm* — Carter, Ledyard & Milburn LLP

(57)         ABSTRACT

A system and method for continuously improving the cyber-security rating of a firm includes a feed processor configured to parse at least one cybersecurity report and to feed for building an instance graph. The system may identify, measure, and monitor portfolio dimensions of public-facing digital artifacts. In addition, the system and method may each include the instance graph being compared by a correlation engine with a reference graph to generate automated or semi-automated remediation recommendations that may lead to continuous improvement of a cybersecurity rating for an organization or firm.

9 Claims, 5 Drawing Sheets

(56) References Cited

U.S. PATENT DOCUMENTS

| | | | | |
|---|---|---|---|---|
| 2009/0240682 A1* | 9/2009 | Balmin | ................ | G06F 16/248 |
| | | | | 707/999.005 |
| 2015/0074579 A1* | 3/2015 | Gladstone | .......... | H04L 63/1441 |
| | | | | 726/25 |
| 2019/0052663 A1* | 2/2019 | Lee | ........................ | H04L 63/20 |
| 2019/0052664 A1* | 2/2019 | Kibler | .................. | G06F 11/301 |
| 2021/0352099 A1* | 11/2021 | Rogers | ................... | H04L 63/20 |
| 2022/0191230 A1* | 6/2022 | Morgan | ................. | H04L 63/20 |
| 2023/0130649 A1* | 4/2023 | Schwartz | ........... | G06F 16/9024 |
| | | | | 726/23 |
| 2023/0229785 A1* | 7/2023 | Jurado | ................. | G06F 3/0483 |
| | | | | 726/25 |
| 2024/0080344 A1* | 3/2024 | Francesco | .......... | H04L 63/1416 |

OTHER PUBLICATIONS

Cheng et al., "Cyber Situation Comprehension for IoT Systems based on APT Alerts and Logs Correlation", College of Computer Science and Technology, Nanjing University of Aeronautics and Astronautics, Nanjing 211106, China. Sensors 2019, 19, 4045. (Year: 2019).*

Liu et al., "Recent Progress of Using Knowledge Graph for Cybersecurity", Science and Technology on Information Systems Engineering Laboratory, National University of Defense Technology, Changsha 410073, China. Electronics MDPI, Jul. 22, 2022. Wiley Dec. 28, 2020. (Year: 2022).*

Shen et al., "Data-Driven Cybersecurity Knowledge Graph Construction for Industrial Control System Security", Wireless Communications and Mobile Computing vol. 2020, Article ID 8883696, 13 pages. (Year: 2020).*

* cited by examiner

SYSTEM AND METHOD FOR CONTINUOUS IMPROVEMENT OF A CYBER SECURITY RATING OF A FIRM

TECHNICAL FIELD

This disclosure relates to continuous improvement of firm cybersecurity ratings and, more particularly, to systems and methods of for continuous improvement of a cybersecurity rating of a firm.

BACKGROUND

As firms around the world become more connected via cyber settings, many firms use one or more rating systems to demonstrate to other firms, other customers, and other government bodies how well they secure information in cybersecurity settings. Such rating systems may be derived from anonymous, individual reviewers; from machine-learning programs; or from professional cybersecurity assessors or auditors. Obtaining a cybersecurity rating through these systems may be costly, may require excessive waiting times, or yield security ratings that are not adequately informative or methodological.

Prior to this disclosure, attempts to reduce problems from rating cybersecurity characteristics of a firm further came in forms of developing case-by-case cybersecurity tests. Another option was to manually install in-house cybersecurity rating systems that have virtually no applicability to other cybersecurity-concerned organizations.

SUMMARY OF THE DISCLOSURE

In one implementation, a system to continuously improve the cybersecurity rating of a firm includes a feed processor configured to parse at least one cybersecurity report and to feed for building an instance graph.

One or more of the following features may be included. The system may include the instance graph being annotated through a knowledge base, as well as being versioned and stored in a graph database. The system may include a cybersecurity knowledge graph builder configured to take input from an organization's software and security events and build a reference graph while assigning a cyber score to at least one node. The system may include a correlation engine configured to compare the instance graph that has been versioned with the reference graph, as well as generate a difference graph. The system may include a recommendation engine configured to parse the difference graph for generating an auto-remediation workflow or for generating a risk registration. The system may include the auto-remediation workflow being configured to execute against the organization's software and security systems, as well as adjust policies and fix vulnerabilities. The system may include the auto-remediation workflow being configured to remediate vulnerabilities and trigger the cybersecurity knowledge graph builder to generate an updated and versioned cybersecurity reference graph.

In another implementation, a method for continuously improving the cybersecurity rating of a firm includes configuring a feed processor configured to parse at least one cybersecurity report and to feed for building an instance graph. The method may include annotating the instance graph through a knowledge base, as well as versioning and storing the instance graph in a graph database. The method may include configuring a cybersecurity knowledge graph builder to take input from an organization's software and security events for building a reference graph while assigning a cyber score to at least one node. The method may include configuring a correlation engine to compare the instance graph that has been versioned with the reference graph and generating a difference graph. The method may include configuring a recommendation engine to parse the difference graph and generate an auto-remediation workflow, or generate a risk registration. The method may include configuring the auto-remediation workflow to execute against the organization's software and security systems and adjust policies and fix vulnerabilities. The method may include configuring the auto-remediation workflow to remediate vulnerabilities and trigger the cybersecurity knowledge graph builder to generate an updated and versioned cybersecurity reference graph.

BRIEF DESCRIPTION OF THE DRAWINGS

Various embodiments in accordance with the present disclosure will be described with reference to the drawings, in which.

DETAILED DESCRIPTION OF THE PREFERRED EMBODIMENTS

Figure 1:
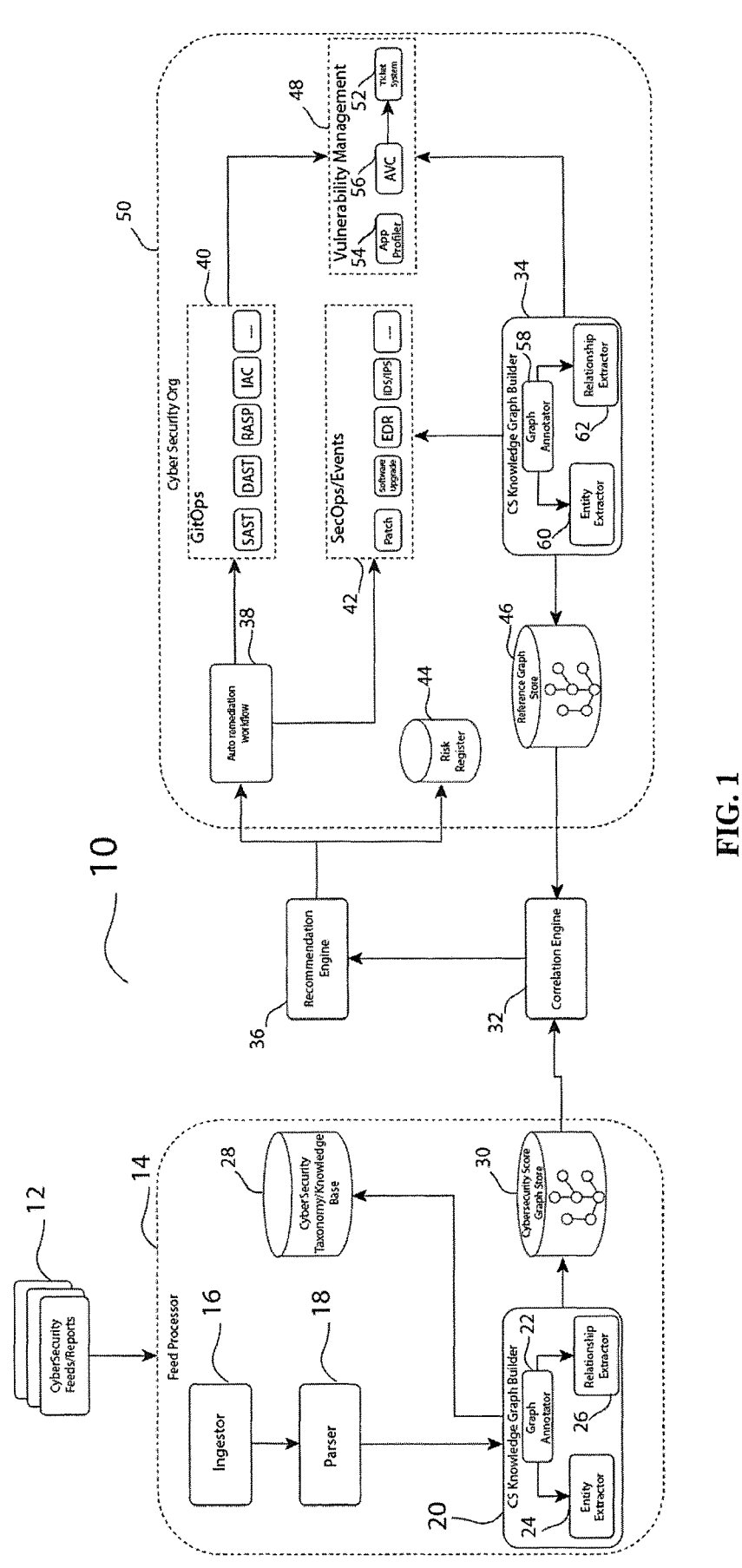
FIG. 1 illustrates an example of a system for continuously improving the cybersecurity rating of a firm.

Referring to FIG. 1, there is shown a system for continuous improvement of a cybersecurity rating of a firm 10. Cybersecurity feeds or reports 12, which may contain information or data relevant to a firm's cybersecurity posture (e.g., strengths and weaknesses) are obtained to be processed through a feed processor 14. Feed processor 14 may parse one or more cybersecurity feeds or reports 12 and feed parsed information for generating a cybersecurity knowledge graph. The cybersecurity knowledge graph, also known as a cybersecurity semantic network, may represent a network of real-world entities (e.g., objects, events, situations, or concepts) and may illustrate relationships between real-world entities. Information pertaining to the cybersecurity knowledge graph may be stored in a graph databased, may be visualized as a graph structure, and may capture cybersecurity semantics and relationships for an organization. The feed processor 14 may include an ingestor 16 that obtains and imports data from the cybersecurity feeds or reports 12; a parser 18 that may receive input from the ingestor 16 and may break input into attributes, entities, relations, or options; a knowledge graph builder 20 that includes a graph annotator 22 for annotating a knowledge graph generated by knowledge graph builder 20 (e.g., annotations of cybersecurity nodes or entities, and edges or relationships; an entity extractor 24 that enables automatic identification or extraction of entities contained in the knowledge graph; and a relationship extractor 26 that enables detection and classification of relationships contained in unstructured text; a cybersecurity taxonomy or knowledge base 28 which may store cybersecurity taxonomy or scores and may be used for annotating graph nodes and edges; and a cybersecurity score graph store 30 that may store versioned cybersecurity knowledge graphs and data models.

FIG. 1 may also present a correlation engine 32 that may generate a difference graph, which may be generated after correlation and comparison between two versioned graphs, particularly an instance graph, which is a graph generated by knowledge graph builder 20, and a reference graph. The reference graph, also known as a reference cybersecurity graph, may be a versioned graph based on software and security events within an organization. The cybersecurity reference graph may either be generated before the instance graph or a graph that was generated by another knowledge graph builder 34 that may be housed in a software framework of a particular cyber security organization 50. The correlation engine 32 may then provide its difference graph(s) to a recommendation engine 36, with the recommendation engine 36 being capable of parsing the difference graph to generate an auto-remediation workflow 38 (which may include a set of steps to fix or prevent software vulnerability). The auto-remediation workflow 38 may execute against the cyber security organization's 50 software and security systems to adjust policies and fix vulnerabilities, e.g., via GitOps operations 40 (which may include static application security testing, dynamic application security testing, run-time application self-protection, or information assurance components, etc.) or security-operations/events 42 (which may include patching, software upgrades, end point detection and response, intrusion detection and prevention, etc.). The recommendation engine 36 is also capable of parsing the difference graph to populate a risk register 44, which may be a log of risks that are detected by a user who keeps track of the recommendation engine's activities. The risk register 44 may also include logs that would need to be tracked, prioritized, and resolved on the basis of risk ranking(s) via semi-automated or manual intervention mechanisms.

FIG. 1 may then present the auto-remediation workflow triggering the knowledge graph builder 34 to generate the updated, cybersecurity reference graph. The knowledge graph builder 34 may have a similar graph annotator 58, entity extractor 60, and relationship extractor 62 to that of knowledge graph builder 20. Following generation of the reference graph, reference graph store 46 may provide the reference graph to the correlation engine 32 for correlation and comparison of at least one versioned instance graph and at least one versioned reference graph to generate a cybersecurity rating of a firm. Moreover, the knowledge graph builder 34 or the GitOps operations 40 may include a vulnerability management system 48 for aggregating, correlating, and managing vulnerabilities. The vulnerability management system 48 may integrate with an enterprise ticketing system 52 to create, track, and prioritize bugs. The vulnerability management system 48 may also include an application profiler 54 and a mechanism for application vulnerability correlation 56. The application profiler 54 may profile an application and store information regarding an application's privacy risk ranking, personal health information, personal identifiable information, key financial systems, externally facing applications, business-critical applications, service-level agreements, application availability, and application contexts (e.g., workload contexts, deployment contexts, business contexts, etc.). The vulnerability management system 48 may further store the profile of an application that has been profiled by application profiler 52, as well as have its information used in generating or updating the reference graph. Finally, application vulnerability correlation 56, as a workflow and process management tool, may be employed to streamline application vulnerability remediation.

Figure 2:
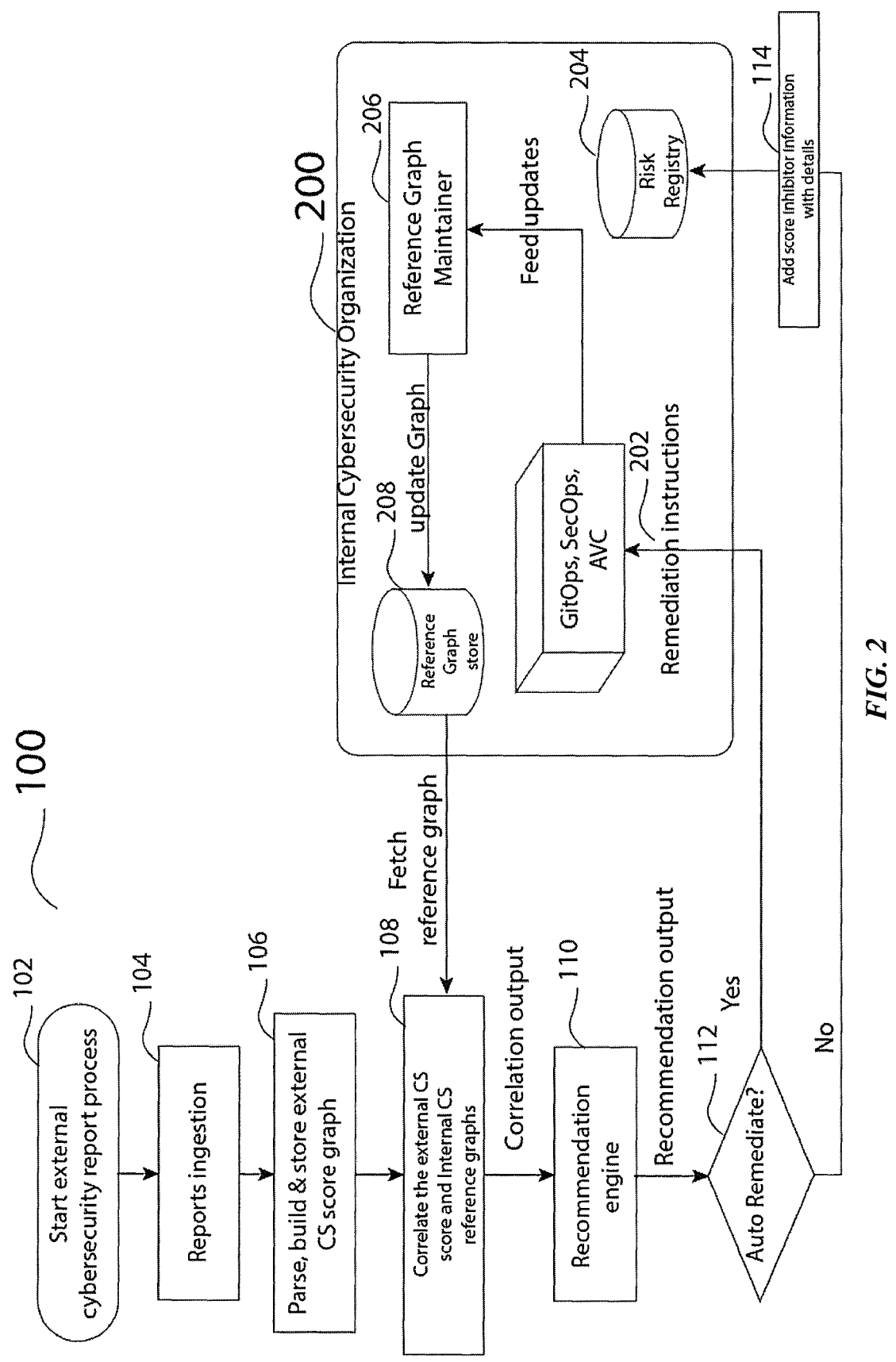
FIG. 2 illustrates an example of a method of continuously improving the cybersecurity rating of a firm.

Referring to FIG. 2, there is shown a method for continuous improvement of a cybersecurity rating of a firm 100. An external cybersecurity report process 102, which may include gathering or obtaining at least one cybersecurity report from a third party service, is initiated, and may take place prior to having the at least one cybersecurity report being sent for data ingestion 104. The ingested data of the at least one report may then be parsed, built, and stored in an external score graph 106 (e.g., an instance graph). The external score graph may then be correlated with a reference graph (as shown in 108), with the reference graph being fetched from a reference graph store 208 of a cybersecurity organization 200.

FIG. 2 may also show a recommendation engine 110 configured to parse a difference graph generated in step 108. The recommendation engine 110 may provide one or more recommendations for remediating one or more vulnerabilities. An auto-remediation step 112 may retrieve the parsed data of the difference graph. The auto-remediation step 112 may further include step 114 to add score inhibitor information, with details, in a risk registry 204. The auto-remediation step 112 may also include sending remediation instructions to operations involving Git, Security, or Application Vulnerability Correlation (as shown in 202). If remediation stemming from the recommendation engine 110 cannot be automated, then risks are logged to Risk Registry 204, whereas if such remediation can be automated, then auto-remediation step 112 may include sending remediation instructions to operations as shown in step 202. Determining whether remediation may be automated assists with resolving or highlighting issues which may affect cybersecurity scoring.

Updates of the remediation instructions from 202 may then be fed to a reference graph maintainer 206, with the maintainer 206 being configured to update knowledge graphs and version them into reference graphs for future storage and comparison purposes in a reference graph store 208. Comparison of instant and future graphs may ultimately yield a cybersecurity rating of a firm.

Figure 3:
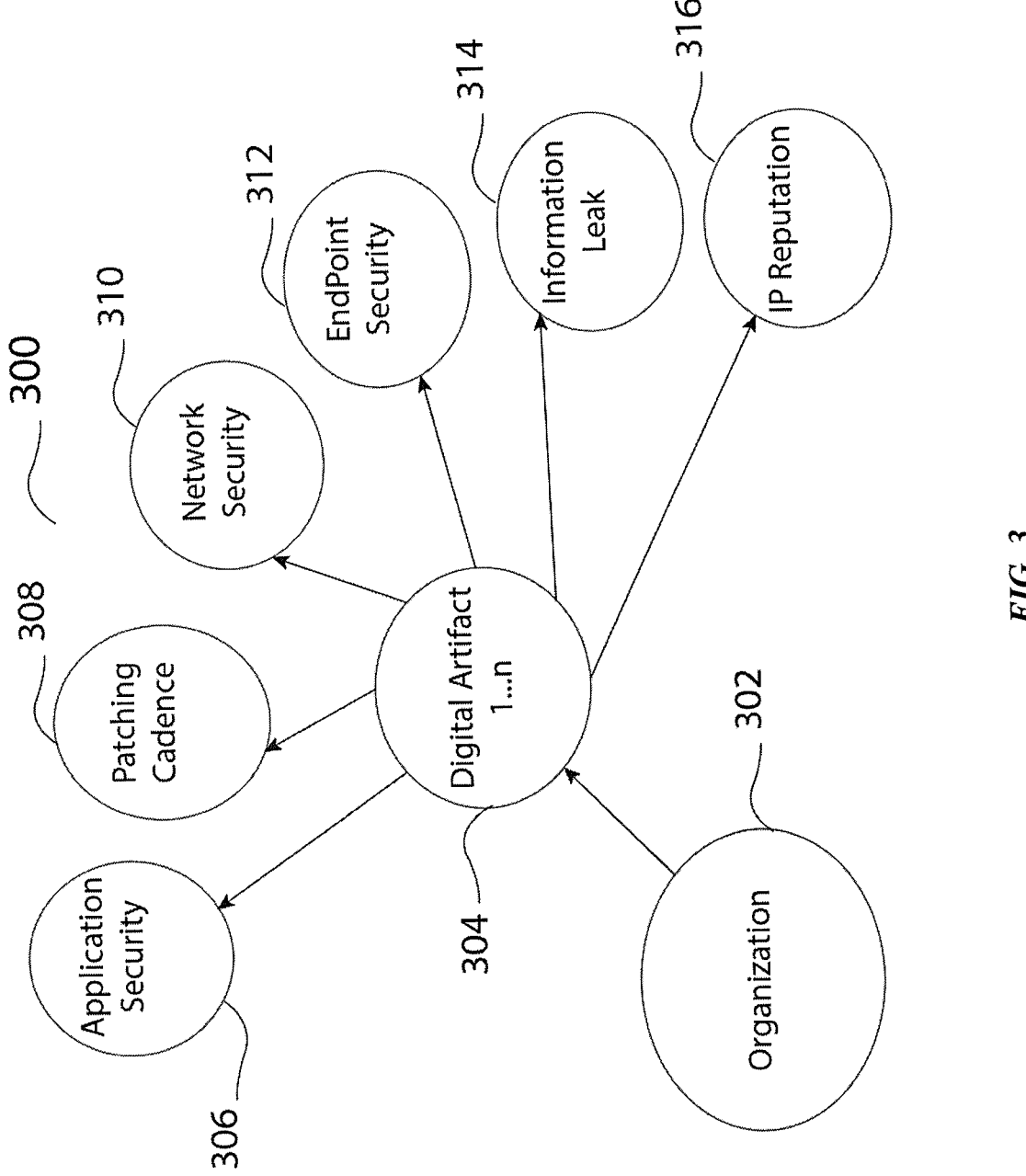
FIG. 3 illustrates an example of an instance graph for continuously improving the cybersecurity rating of a firm.

Referring now to FIG. 3, there is shown an example of an instance graph 300 that may be employed in either a system or a method for continuous improvement of a cybersecurity rating of a firm. A given organization 302 may initially possess cybersecurity information in one or more settings. For instance, through one or more digital artifacts 304 (e.g., one or more pieces of digital information) coming from organization 302, cybersecurity information may come from a reading of application security 306 for one or more particular computer applications developed by organization 302. The digital artifact(s) 304 may also include patching cadence 308 for determining how many vulnerabilities organization 302 may have in its system and how many critical vulnerabilities have yet to be patched. Network security 310, which may include organization's 302 security policies, may constitute cybersecurity information of organization 302. Information regarding organization's 302 endpoint security 312 (e.g., the practice of securing endpoints or entry points of end-user devices such as desktops, laptops, and mobile devices from being exploited by malicious actors and campaigns) may also be used as a cybersecurity information source in instance graph 300. Further information on organization's 302 information leaks 314 (e.g., when secret information correlates with, or can be correlated with, observable information) and IP address reputation 316 (e.g., a history of an IP address's activity) may also be employed for generating instance graph 300.

Figure 4:
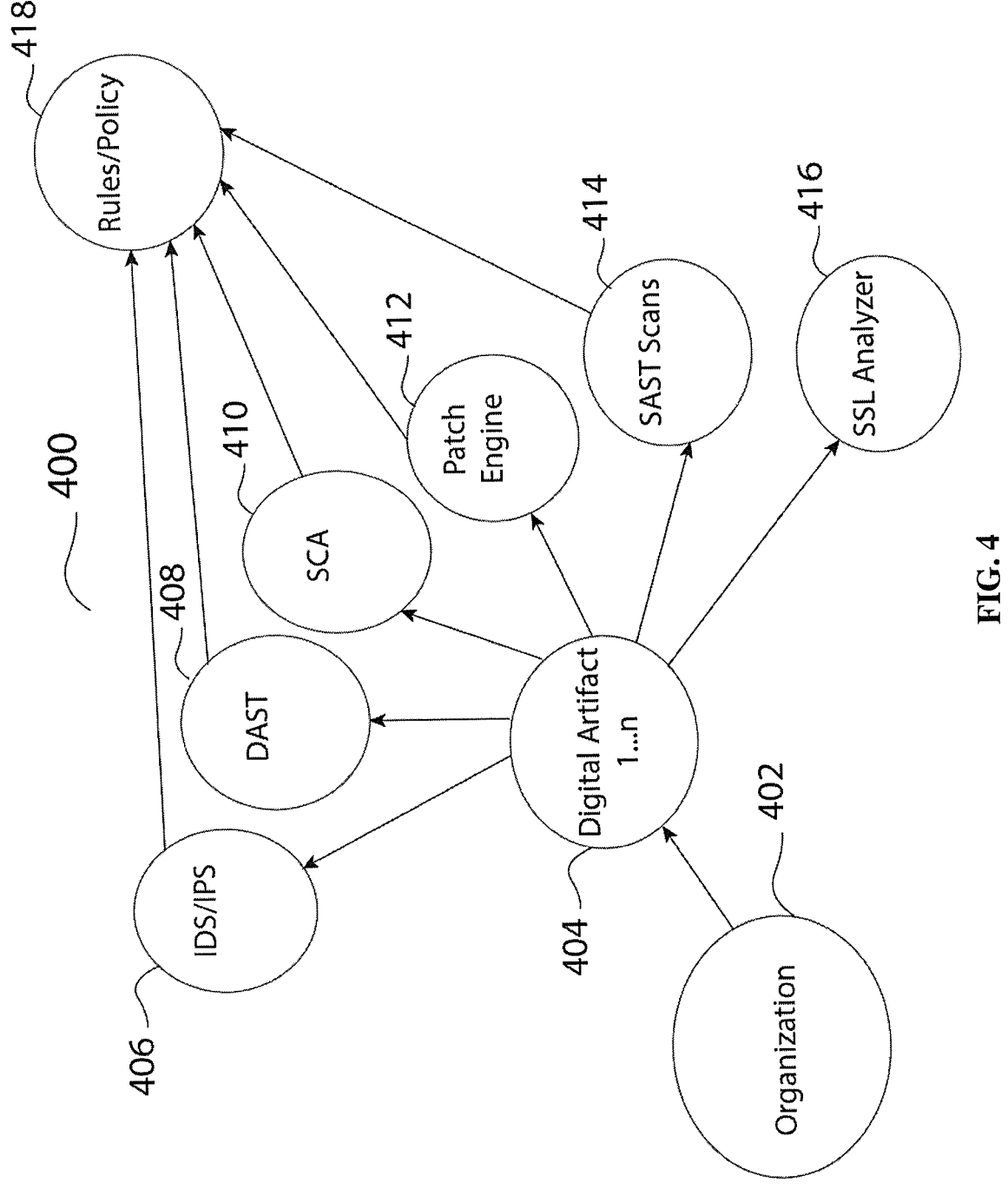
FIG. 4 illustrates an example of a reference graph for continuously improving the cybersecurity rating of a firm.

Referring now to FIG. 4, there is shown an example of a reference graph 400 that may be employed in either a system or a method for continuous improvement of a cybersecurity rating of a firm. A given organization 402 may have at least one digital artifact 404 that may be obtained or evaluated. The at least one digital artifact 404 may have its cybersecurity information evaluated via an intrusion detection system or an intrusion prevention system 406 (e.g., a device or software application that monitors a network or systems for malicious activity or policy violations); Dynamic Application Security Testing (DAST) 408 (e.g., a process of analyzing a web application through a front-end to find vulnerabilities through simulated attacks); software composition analysis 410 (SCA, e.g., an automated process that identifies the open source software in a codebase); a patch or patch engine 412 (e.g., a set of changes to computer programs or supporting data); static application security testing (SAST) scans 414 (e.g., analyzing source code before the code is compiled); and a secure socket layer (SSL) analyzer 416 (e.g., a tool that verifies proper installation of a secure socket layer). Reference graph 400 may further include a rules/policy component 418 that is characterized by intrusion prevention system/intrusion detection system 406, DAST 408, SCA 410, patch or patch engine 412, and SAST scans 414.

Figure 5:
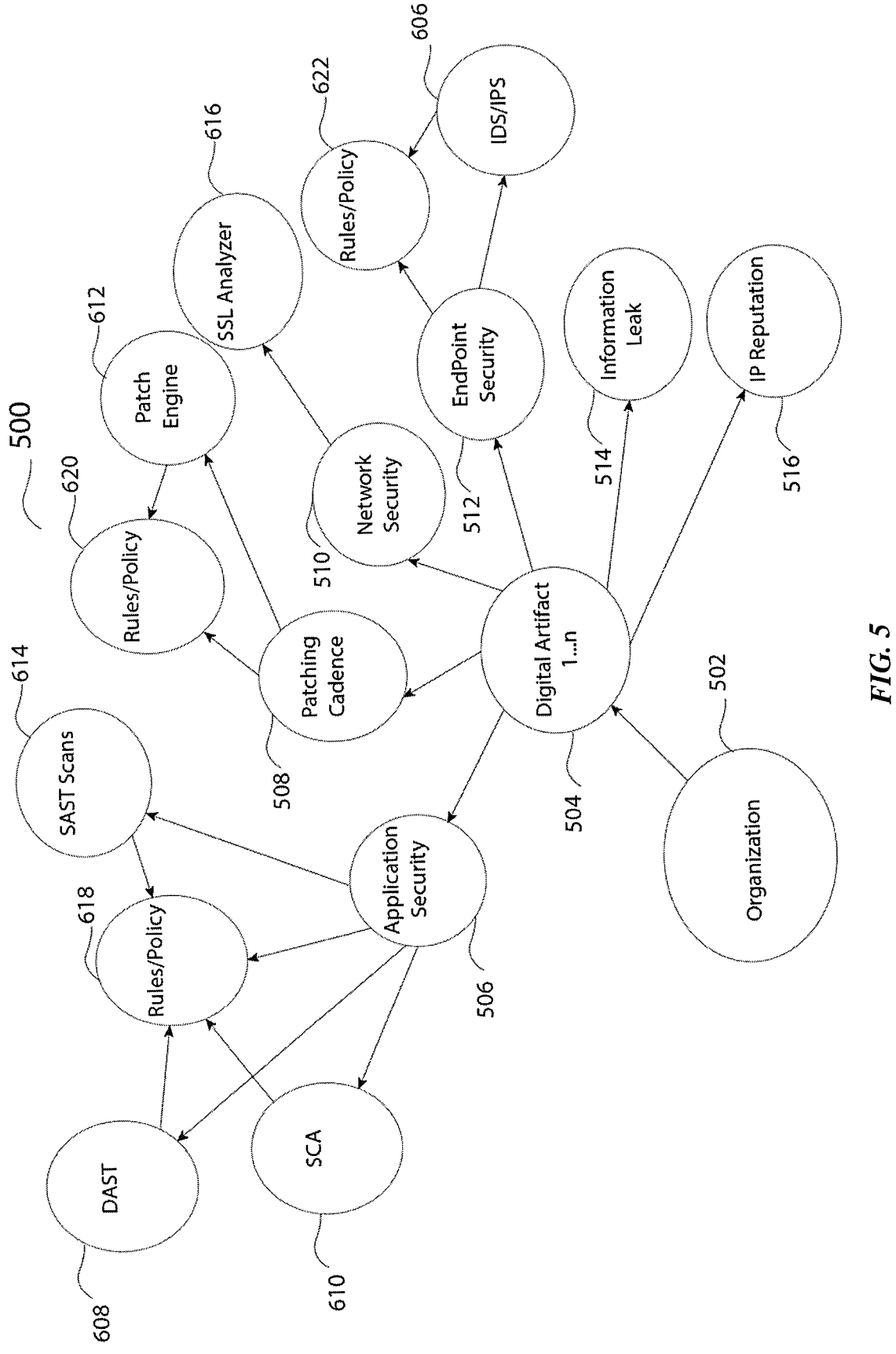
FIG. 5 illustrates an example of a difference graph for continuously improving the cybersecurity rating of a firm.

Referring now to FIG. 5, there is shown an example of a difference graph 500 that may be employed in either a system or a method for continuous improvement of a cybersecurity rating of a firm. An example of a difference graph may include information that illustrates a comparison of information between the instance graph and the reference graph of FIG. 4 and FIG. 5, respectively. For instance, organization 502, digital artifact(s) 504, information of application security 506, patching cadence 508, network security 510, endpoint security 512, information leak 514, and IP address reputation 516 may be derived from or resemble each of their same-named, corresponding components as illustrated in the example instance graph of FIG. 3 (e.g., organization 302 and 502 may be considered as the same organization, digital artifact(s) 504 may be the same digital artifact(s) as digital artifact(s) 304, application security 504 may be the same application security as application security 304, etc.). The remaining components (numbered 606-622, even numbers only) may include corresponding components as illustrated in FIG. 4 (e.g., intrusion detection system/intrusion prevention system 606 may be the same as intrusion detection system/intrusion prevention system 406; DAST 608 may be the same as DAST 408; SCA 610 may be the same as SCA 410; etc.). Overall, components between FIG. 3 and FIG. 4 may be compared as illustrated in the difference graph 500.

FIG. 5 may further illustrate rules/policies 618, 620, and 622, each characterized by different graph components derived from an instance graph and a reference graph, with such graphs shown as examples as illustrated in FIGS. 3 and 4. For instance, rules/policies 618 may be characterized by a comparison between application security 506 and reference graph components DAST 608, SCA 610, and SAST Scans 614. Rules/policy 620 may be characterized by a comparison between patching cadence 508 and patch engine 612. Rules/policy 622 may be characterized by a comparison between endpoint security 512 and intrusion detection system/intrusion prevention system 606.

FIG. 5 may further illustrate, as shown in difference graph 500, how components of example instance graph 300 and example reference graph 400 may be employed in either a system or a method for continuous improvement of a cybersecurity rating of a firm. The difference graph 500 may be used to generate a cybersecurity rating of a firm following a comparison of instance graph and reference graph components. The cybersecurity rating may then be continuously improved when additional comparisons of subsequently generated instance and reference graphs, as represented in a subsequently generated difference graph, demonstrate more-ideal security characteristics. For instance, should the subsequently generated difference graph show less security vulnerabilities compared to a previously generated difference graph, then a firm's cybersecurity rating may likely improve. Moreover, the subsequently generated difference graph may be used to create one or more new reference graphs for future comparisons with other instance graphs.

GENERAL

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A system to continuously improve the cybersecurity rating of a firm, comprising:

at least one processor;

at least one memory coupled to the at least one processor;

an endpoint;

an endpoint detection response and intrusion prevention device, executed by the at least one processor, wherein the endpoint detection response and intrusion prevention device evaluates cybersecurity information of the endpoint by monitoring network and system activity at the endpoint for at least one malicious behavior and at least one policy violation in real-time and automatically preventing detected malicious activity by blocking malicious network traffic;

a feed processor executed by the at least one processor and configured to:

ingest a cybersecurity feed comprising cybersecurity posture information from the endpoint detection response and intrusion prevention device, parse the cybersecurity feeds to extract cybersecurity attributes, entities and relationships, and construct a knowledge graph based on the extracted attributes, entities and relationships;

a graph database stored in the at least one memory and configured to:

store the knowledge graph as an instance graph, version the instance graph to maintain historical states, and annotate at least one node and at least one edge of the instance graph with cybersecurity taxonomy information from a knowledge base, the knowledge base configured to provide cybersecurity taxonomy information for annotating the at least one node and the at least one edge of the instance graph;

a correlation engine executed by the at least one processor and configured to:

compare the versioned instance graph with a reference graph, identify differences between the versioned instance graph and the reference graph, and generate a difference graph representing the identified differences; and an auto-remediation workflow engine executed by the at least one processor and configured to:

analyze the difference graph to detect security vulnerabilities, automatically generate remediation instructions based on the detected vulnerabilities, execute the remediation instructions against an organization's software and security systems by performing at least one of run-time application self-protection to automatically block malicious activity during application execution, intrusion detection and prevention, pathing, endpoint detection and response, static application security testing, or dynamic application security testing, to adjust security policies and fix the vulnerabilities, and trigger generation of an updated reference graph reflecting the executed remediation.

2. The system of claim 1, further comprising a cybersecurity knowledge graph builder configured to take input from an organization's software and security events and build the reference graph while assigning a cyber score to the at least one node.

3. The system as claimed in claim 1, further comprising a recommendation engine configured to parse the difference graph for generating the auto-remediation workflow, or for generating a risk registration.

4. The system as claimed in claim 3, further comprising the auto-remediation workflow being configured to remediate vulnerabilities and trigger the cybersecurity knowledge graph builder to generate an updated and versioned cybersecurity reference graph.

5. A method for continuously improving the cybersecurity rating of a firm, comprising:

evaluating, using at least one processor, cybersecurity information of an endpoint via an endpoint detection response and intrusion prevention device by:

monitoring network and system activity at the endpoint for malicious behavior and policy violations in real-time, automatically preventing detected malicious activity by blocking malicious network traffic, and generating cybersecurity event data based on the detected behavior and violations;

constructing, using the at least one processor, a cybersecurity knowledge graph by:

ingesting the cybersecurity event data from the endpoint detection response and intrusion prevention device, parsing the cybersecurity event data to extract cybersecurity attributes, entities and relationships, and building an instance graph based on the extracted attributes, entities and relationships;

processing, using the at least one processor, the instance graph by:

storing the instance graph in a graph database stored in at least one memory, versioning the instance graph to maintain historical states, and annotating at least one node and at least one edge of the instance graph with cybersecurity taxonomy information from a knowledge base;

performing, using the at least one processor, security analysis by:

comparing the versioned instance graph with a reference graph, identifying differences between the instance graph and reference graph, generating a difference graph representing the identified differences, and detecting security vulnerabilities based on analysis of the difference graph; and executing, using the at least one processor, automated remediation by:

generating remediation instructions based on the detected vulnerabilities, automatically implementing the remediation instructions against the organization's software and security systems by performing a least one of: run-time application self protection to automatically block malicious activity during application execution, intrusion detection and prevention, patching, endpoint detection and response, static application security testing, or dynamic application security testing, to adjust security policies and fix the vulnerabilities, and triggering generation of an updated reference graph reflecting the implemented remediation.

6. The method as claimed in claim 5, further comprising configuring a cybersecurity knowledge graph builder to take input from an organization's software and security events for building the reference graph while assigning a cyber score to the at least one node.

7. The method as claimed in claim 6, further comprising configuring a correlation engine to compare the instance graph that has been versioned with the reference graph and generating the difference graph.

8. The method as claimed in claim 7, further comprising configuring a recommendation engine to parse the difference graph and generate the auto-remediation workflow, or generate a risk registration.

9. The method as claimed in claim 8, further comprising configuring the auto-remediation workflow to remediate vulnerabilities and trigger the cybersecurity knowledge graph builder to generate an updated and versioned cyber-security reference graph.

\* \* \* \* \*